United States Patent [19]

Schaenzer et al.

[11] Patent Number: 5,748,407
[45] Date of Patent: May 5, 1998

[54] SLIDER WITH OBLIQUE LEADING AND TRAILING EDGES

[75] Inventors: Mark James Schaenzer, Eagan; Ronald Henry Wrase, Burnsville, both of Minn.

[73] Assignee: Seagate Technology, Inc., Scotts Valley, Calif.

[21] Appl. No.: 675,384

[22] Filed: Jul. 2, 1996

[51] Int. Cl.⁶ .................................................. G11B 5/60
[52] U.S. Cl. .................................................. 360/103
[58] Field of Search .................................................. 360/103

[56] References Cited

U.S. PATENT DOCUMENTS 4,823,205  4/1989  Hannon .................................................. 360/103

FOREIGN PATENT DOCUMENTS 61-96509   5/1986   Japan .................................................. 360/103
6-243431   9/1994   Japan .................................................. 360/103

*Primary Examiner*—A. J. Heinz
*Attorney, Agent, or Firm*—Westman, Champlin & Kelly, P.A.

[57] ABSTRACT

A slider for use in a disc drive data storage system is disclosed. The slider includes an air bearing surface, a top surface and a first surface extending between the air bearing surface and the top surface. The first surface is oriented relative to at least one of a plane of the air bearing surface and a plane of the top surface such that the first surface forms an oblique angle with the plane to thereby provide increased surface area on the first surface.

8 Claims, 4 Drawing Sheets

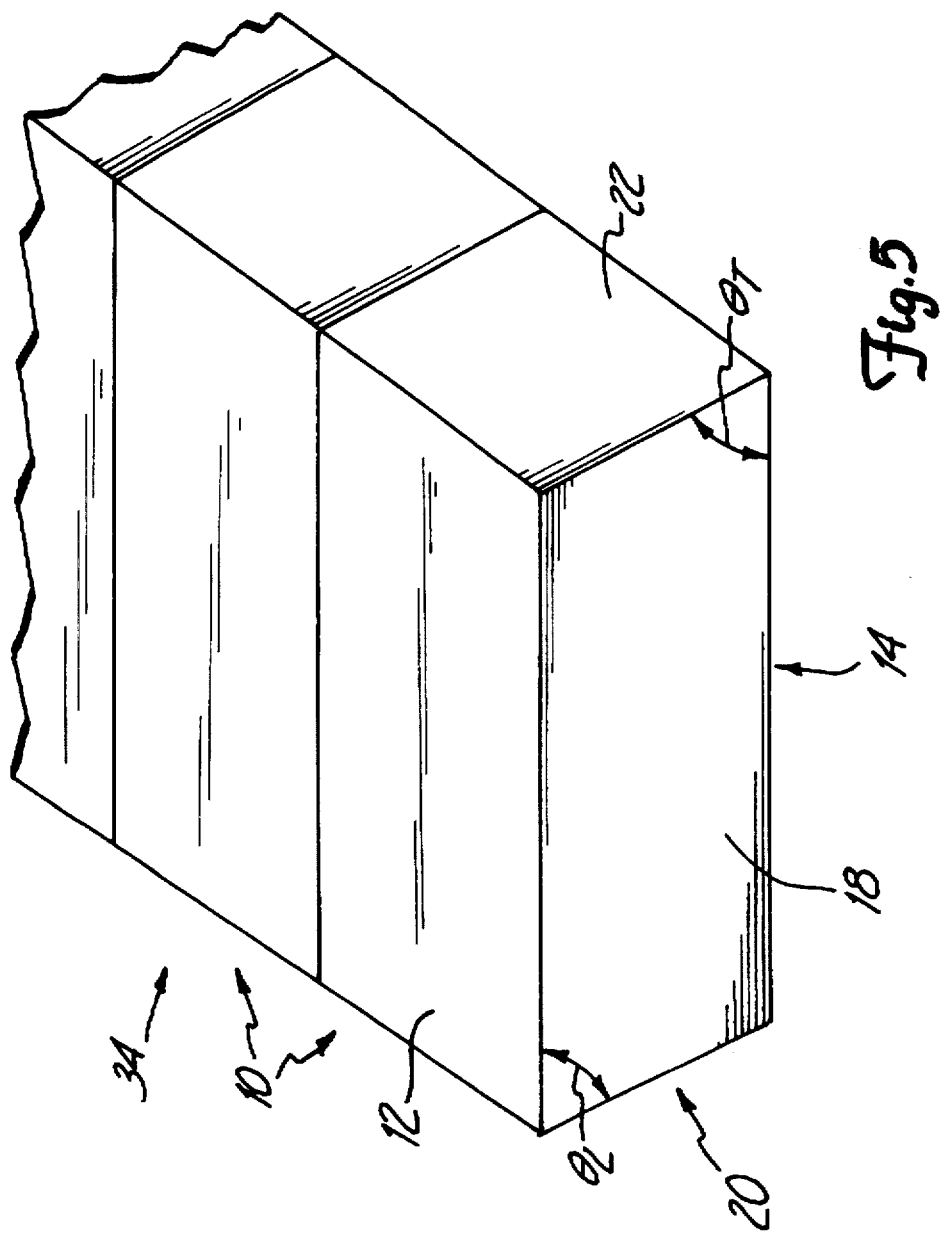

SLIDER WITH OBLIQUE LEADING AND TRAILING EDGES

BACKGROUND OF THE INVENTION

The present invention relates to transducer-carrying sliders for use in disc drive data storage systems, and more particularly, to an improved slider having an angled trailing edge or other surface to provide a variety of advantages over conventional generally rectangular-shaped sliders.

The industry trend in magnetic disc drive data storage systems continues to be to reduce the size and spacing of the components to thereby provide increased storage capacity using the same or less area than occupied by previous disc drive generations. As the disc-to-disc spacing in disc drives is reduced, the thickness and overall size of the transducer or head carrying sliders must be reduced as well. As the size of the sliders becomes smaller and the overall heights of the head gimbal assemblies (HGA) are reduced, a number of design limitations have become increasingly important. For example, thinner sliders provide less room for the heads or transducers, and therefore result in reduced head or transducer sizes. Further, the surface area available for bondpads on the trailing edge face or other surface of the slider is decreased as well.

Other HGA wire bonding issues must also be addressed. For example, with conventional slider designs having the bondpads located on the trailing edge face, it is difficult to automate or mechanize the wire bonding process since the trailing edge face is positioned substantially perpendicular to the top surface of the slider where a majority of the mechanized process steps are taking place. Further, the influence of wires on the fly height performance of conventional sliders is a significant problem. As the slider size continues to shrink, the wires play an increasing role in the contribution to fly height variance.

Therefore, there is a need for an improved slider design which addresses these and other limitations of the prior art.

SUMMARY OF THE INVENTION

A slider for use in a disc drive data storage system is disclosed. The slider includes an air bearing surface, a top surface and a first surface extending between the air bearing surface and the top surface. The first surface is oriented relative to a plane of at least one of the air bearing surface and the top surface such that the first surface forms an oblique angle with the plane to thereby provide increased surface area on the first surface.

BRIEF DESCRIPTION OF THE DRAWINGS

FIG. 3 is a diagrammatic side view of a portion of a disc drive data storage system including the slider of the present invention.

FIG. 5 is a diagrammatic top view, in perspective, illustrating another step in a process of manufacturing the improved sliders of the present invention.

DETAILED DESCRIPTION OF THE PREFERRED EMBODIMENTS

Figure 1:
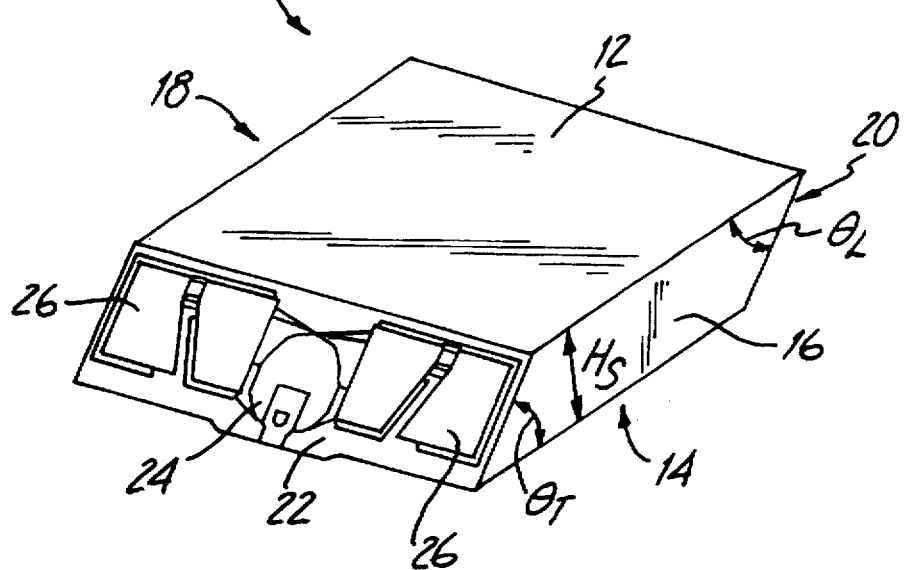
FIG. 1 is a top diagrammatic view, in perspective, of a magnetic transducer-carrying slider in accordance with preferred embodiments of the present invention.
Figure 2:
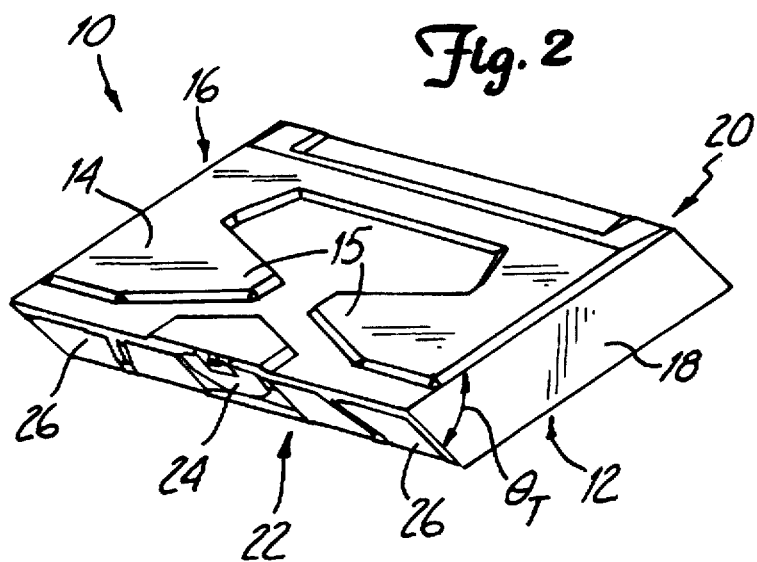
FIG. 2 is a bottom diagrammatic view, in perspective, of the slider of the present invention illustrated in FIG. 1.
Figure 9:
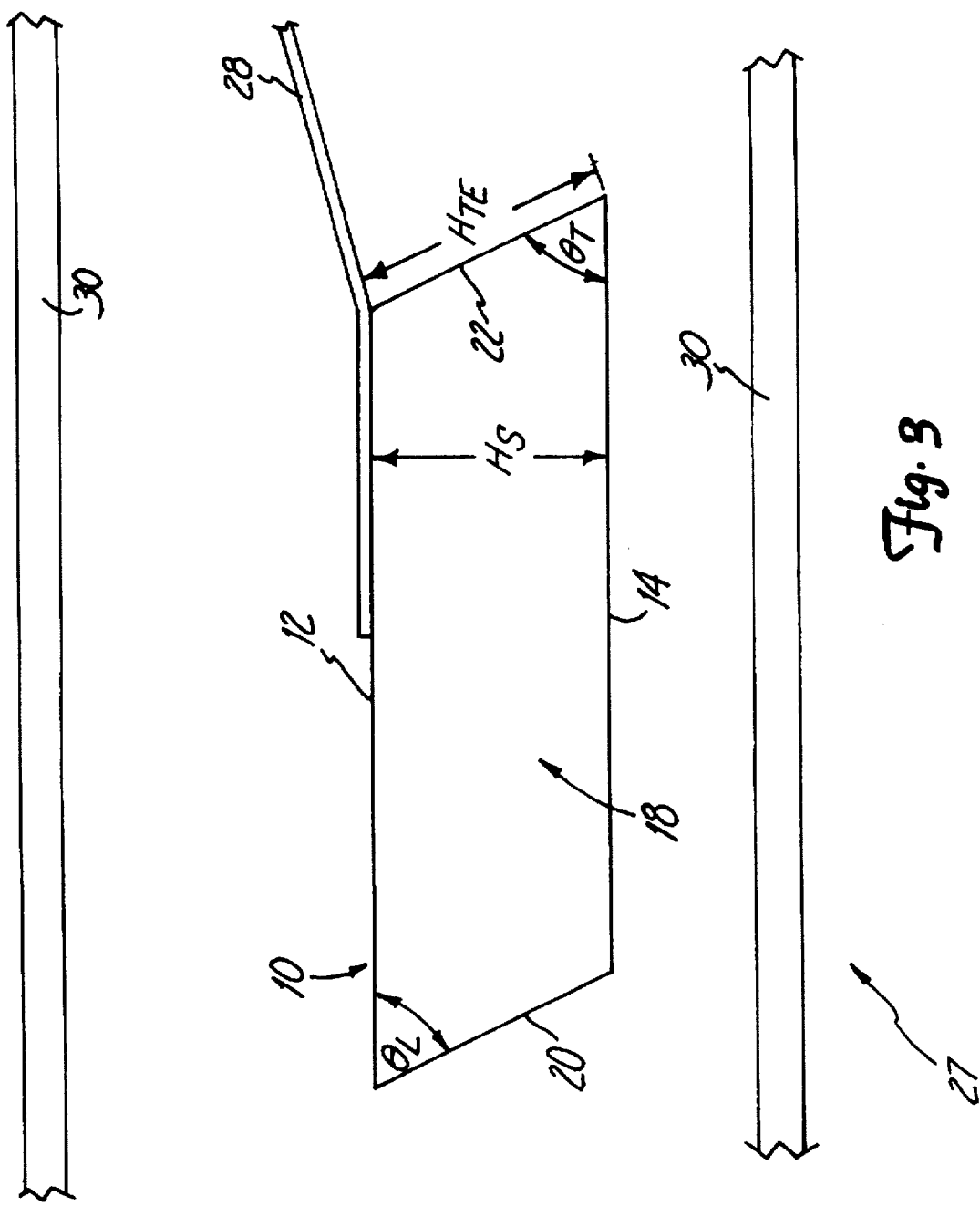

FIGS. 1 and 2 are diagrammatic top and bottom perspective views, respectively, of magnetic transducer or head carrying slider 10 in accordance with preferred embodiments of the present invention. Like conventional sliders, slider 10 includes top surface 12, bottom or air bearing surface (ABS) 14, side surfaces 16 and 18, leading edge face or surface 20, and trailing edge face or surface 22. At trailing edge face 22, slider 10 carries one or more magnetic heads or transducers 24 and/or bondpads 26, which can be electrically connected to external circuitry with wires attached to bondpads 26. However, transducers 24 can be positioned on other surfaces or elsewhere in slider 10.

In conventional rectangular-shaped slider designs, the side surfaces, the leading edge face and the trailing edge face are all oriented substantially perpendicular to the top surface and to the ABS. While many conventional slider designs utilize an ABS with contours and features that do not lie in a single plane, a plane of the ABS which is substantially parallel to the top surface can generally be identified. Frequently, this plane includes portions of rails 15.

Like conventional slider designs, in slider 10 of the present invention, side surfaces 16 and 18 are preferably oriented substantially perpendicular to a plane of top surface 12 and to a plane of ABS 14. However, unlike conventional slider designs, one or both of leading edge face 20 and trailing edge face 22 are not oriented perpendicular to the plane of top surface 12 and the plane of ABS 14. Instead, these surfaces are each oriented at oblique angles with respect to the planes of top surface 12 and ABS 14. For example, in the embodiment illustrated in FIGS. 1 and 2, leading edge face 20 is oriented such that it forms angle $\theta_L$ with a plane of top surface 12. Similarly, trailing edge face 22 is oriented such that it forms angle $\theta_T$ with a plane of ABS 14. In preferred embodiments, angles $\theta$ can be any of a wide range of angles. In some preferred embodiments, angles $\theta$ are between 30° and 60°, for example, 45°. Further, the angle formed between leading edge face 20 and the plane of top surface 12 need not be identical to the angle formed between trailing edge face 22 and the plane of ABS 14. However, in preferred embodiments, these two angles are the same so that slider 10 has a parallelogram-type shape when viewed from the side (FIG. 3).

The parallelogram (or at least non-rectangular) shape of the slider of the present invention, with the leading and trailing edge faces oriented non-perpendicular to planes of top surface 12 and of ABS 14 provides a number of advantages over the prior art. First, if overall slider height $H_S$ at a position proximate or adjacent to transducer 24 and/or bondpads 26 is reduced to minimize the overall HGA height as is the trend in the industry, effective height $H_{TE}$ (FIG. 3) of trailing edge face 22 (or other surfaces) is affected to a lesser extent. This beneficial feature of the present invention is in sharp contrast to conventional sliders in which there is a 1:1 relationship between a reduction in height $H_S$ and the resulting reduction in height $H_{TE}$. Therefore, slider 10 of the present invention can employ a shorter slider height $H_S$ than conventional sliders while still realizing the same trailing edge face height $H_{TE}$ and/or the same height of other surfaces.

By cutting the wafers at angles $\theta$ (45°, for example) during the fabrication of slider 10, the area available for bondpads 26 is increased over conventional sliders having the same overall slider height $H_S$. Further, having bondpads 26 positioned on sloped or angled trailing edge face 22 (or another sloped or angled surface) improves the conformal epoxy application process. Also, because the angled orientation of trailing edge face 22 allows the wires to be moved out of the active fly height plane, this design reduces the influence of the wires, used to connect bondpads 26 to external circuitry, on fly height variance. Further yet, angled trailing edge face 22 provides improved access to bondpads 26 from the direction of top surface 12, which enables the HGA fabrication process to be more easily and more completely mechanized or automated.

Another advantage of slider 10 of the present invention relates to the available space for transducers 24. The wafer area available for placing the transducer has been reduced considerably in recent disc drive generations. By orienting trailing edge face 22 at an angle relative to top surface 12 or air bearing surface 14, reductions in slider height $H_S$ result in considerably less significant reductions in available area for transducers 24.

FIG. 3 is a diagrammatic side view of slider 10 of the present invention used in disc drive data storage system 27. As illustrated in FIG. 3, slider 10 is supported by arm 28 to form at least a portion of an HGA. With the help of arm 28, slider 10 "flies" over a surface of one of magnetic discs 30. It must be noted that the orientation of slider 10 relative to disc 30 is simply illustrative and is not intended to represent the actual orientation during operation. Furthers the manner in which arm 28 is connected to slider 10 is also a simplified illustration provided for the benefit of the reader and is not intended to limit the scope of the invention in any way.

As can be seen more clearly in FIG. 3, slider height $H_S$ can be reduced without significantly reducing effective height $H_{TE}$ of trailing edge face 22 (as compared to conventional slider designs having an identical slider height $H_S$ reduction) . This ability to reduce slider height $H_S$ while affecting trailing edge face height $H_{TE}$ to a significantly lesser degree allows the overall height of the HGA (including arm 28) to be reduced so that discs 30 can be placed more closely together.

While a plane of bottom surface 14 of the slider 10 which contains the bottom surfaces of the slider's rails can be generally defined as the ABS, the geometry of the bottom surface of some slider designs is very complex. Further, in alternate embodiments, transducers 24 and/or bondpads 26 can be located at a surface of the slider other than trailing edge face 22. Therefore, the invention can be described in another manner to more clearly illustrate the scope of the invention. At least one of surfaces 16, 18, 20 and 22 of slider 10 are provided at an angle, or are otherwise oriented, such that the height or distance (i.e., surface height $H_{TE}$) of the particular surface between top surface 12 and ABS 14 is greater than the minimum distance between top surface 12 and ABS 14 at a position proximate the particular angled surface. Thus, the invention provides additional surface area of a desired surface for the transducers and/or bondpads.

Figure 4:
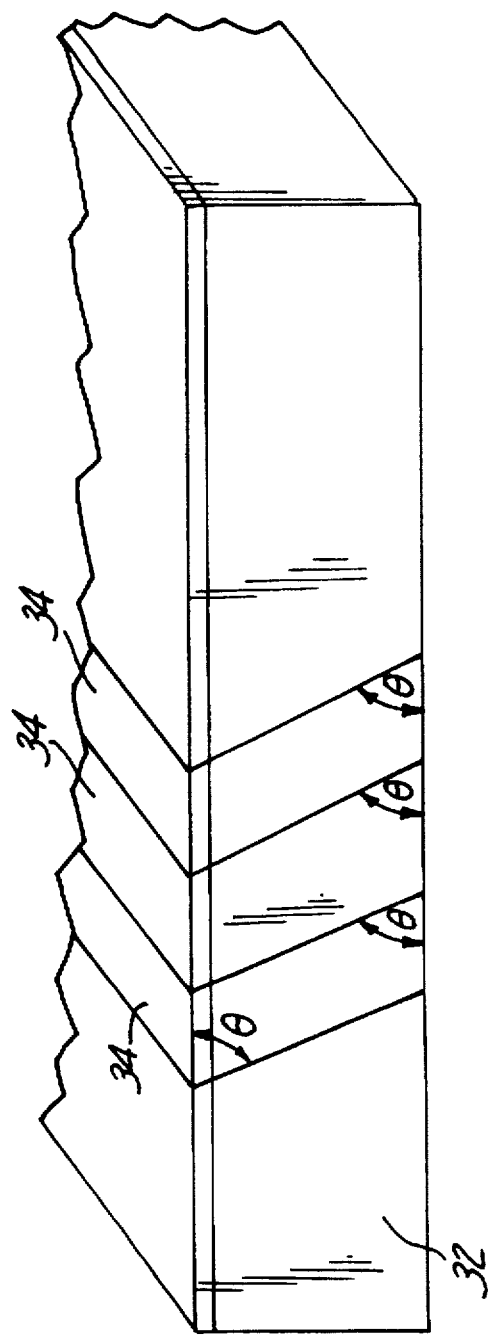
FIG. 4 is a diagrammatic top view, in perspective, which illustrates a step in a process of manufacturing the improved sliders of the present invention.

FIGS. 4 and 5 illustrate two steps in a process for producing the generally parallelogram-shaped sliders of some embodiments of the present invention. In one possible process, wafer 32 is cut at angles θ (relative to one of its surfaces) to produce multiple bars 34. Like conventional processes, each of bars 34 contains a number of sliders. By cutting bars 34 from wafer 32 at angles θ, instead of using perpendicular cuts as is the case in conventional slider fabrication processes, each bar 34 will include a plurality of generally parallelogram-shaped sliders 10. Next, each of bars 34 is diced at 90° angles to separate individual sliders 10. The result is multiple sliders 10 having side surfaces (i.e., side surfaces 16 and 18) which are substantially perpendicular to top surface 12 and ABS 14 of the corresponding slider. However, leading and trailing edge faces (i.e., faces 20 and 22) form angle θ with respective ones of top surface 12 and ABS 14 of the slider.

When fabricating the sliders of the present invention, other design factors should be considered. For example, in order to achieve the same alignment of the magnetoresistive (MR) reader transducer to the inductive writer transducer, as compared to the alignment desired in a conventional slider, an additional vertical offset will need to be introduced as a result of the angled trailing edge face.

Although the present invention has been described with reference to preferred embodiments, workers skilled in the art will recognize that changes may be made in form and detail without departing from the spirit and scope of the invention. For example, while the present invention has been discussed primarily in terms of a parallelogram-shaped slider, many of the advantages of the present invention can be realized by orienting the trailing edge face at an angle relative to the ABS, while leaving the leading edge face substantially perpendicular to the ABS. Further, while side surfaces 16 and 18 have been described as being perpendicular to ABS 14, this need not be the case. These and other modifications of the preferred embodiments are intended to be covered by the claims as well.

What is claimed is:

1. A slider for use in a disc drive data storage system comprising:

an air bearing surface formed substantially in a plane;

a top surface oriented substantially parallel to the plane of the air bearing surface;

a substantially planar trailing edge surface extending from the air bearing surface to the top surface such that the trailing edge surface forms a first oblique angle with the plane of the air bearing surface; and a substantially planar leading edge surface extending from the top surface to the air bearing surface such that the leading edge surface forms a second substantially oblique angle with the top surface.

2. The slider of claim 1, wherein the second substantially oblique angle is approximately equal to the first substantially oblique angle.

3. The slider of claim 2, and further comprising first and second side surfaces disposed between the air bearing surface and the top surface and between the trailing edge surface and the leading edge surface, wherein the first and second side surfaces are each oriented substantially perpendicular to the plane of the air bearing surface and to the top surface.

4. A slider for use in a disc drive data storage system comprising:

an air bearing surface;

a top surface spaced apart from and parallel to the air bearing surface;

a trailing edge surface extending from a first end of the air bearing surface to a first end of the top surface, wherein the trailing edge surface is oriented such that a minimum distance across the trailing edge surface from the air bearing surface to the top surface is greater than a minimum distance between the air bearing surface and the top surface in a region of the slider proximate the trailing edge surface;

a leading edge surface positioned at a second end of the air bearing surface and at a second end of the top surface;

a magnetic transducer located at the trailing edge surface of the slider; and bond pads coupled to the magnetic transducer and located at the trailing edge surface of the slider for electrically coupling the transducer to external circuitry;

wherein the trailing edge surface is oriented at a first oblique angle relative to one of a plane of the top surface and a plane of the air bearing surface to thereby provide an increased surface area of the trailing edge surface, and the leading edge surface is parallel to the trailing edge surface.

5. The slider of claim 4 and further comprising first and second side surfaces disposed between the air bearing surface and the top surface and between the trailing edge surface and the leading edge surface, wherein the first and second side surfaces are each oriented substantially perpendicular to planes of the air bearing surface and the top surface.

6. A disc drive data storage system comprising:
   a magnetic disc having a first disc surface;
   a slider comprising:
     an air bearing surface;
     a top surface;
     a substantially planar trailing edge surface positioned at a first end of the air bearing surface and at a first end of the top surface and extending therebetween;
     a substantially planar leading edge surface positioned at a second end of the air bearing surface and at a second end of the top surface and extending therebetween wherein the leading edge surface is oriented at a second oblique angle relative to at least one of the plane of the top surface and the plane of the air bearing surface;
     a magnetic transducer; and
     bond pads coupled to the magnetic transducer and located at the trailing edge surface of the slider for electrically coupling the transducer to external circuitry, wherein the trailing edge surface is oriented at a first oblique angle relative to at least one of a plane of the top surface and a plane of the air bearing surface to thereby provide an increased surface area of the trailing edge surface; and
   a slider carrying arm for supporting the slider over the first disc surface of the magnetic disc.

7. The slider of claim 6, wherein the leading edge surface is further oriented parallel to the trailing edge surface.

8. The slider of claim 7, and further comprising first and second side surfaces disposed between the air bearing surface and the top surface and between the trailing edge surface and the leading edge surface, wherein the first and second side surfaces are each oriented substantially perpendicular to the air bearing surface and to the top surface.

* * * * *